Jan. 8, 1935.　　L. V. KINGSBURY　　1,986,975
HILL DROP PLANTER
Filed Aug. 13, 1932　　2 Sheets-Sheet 1
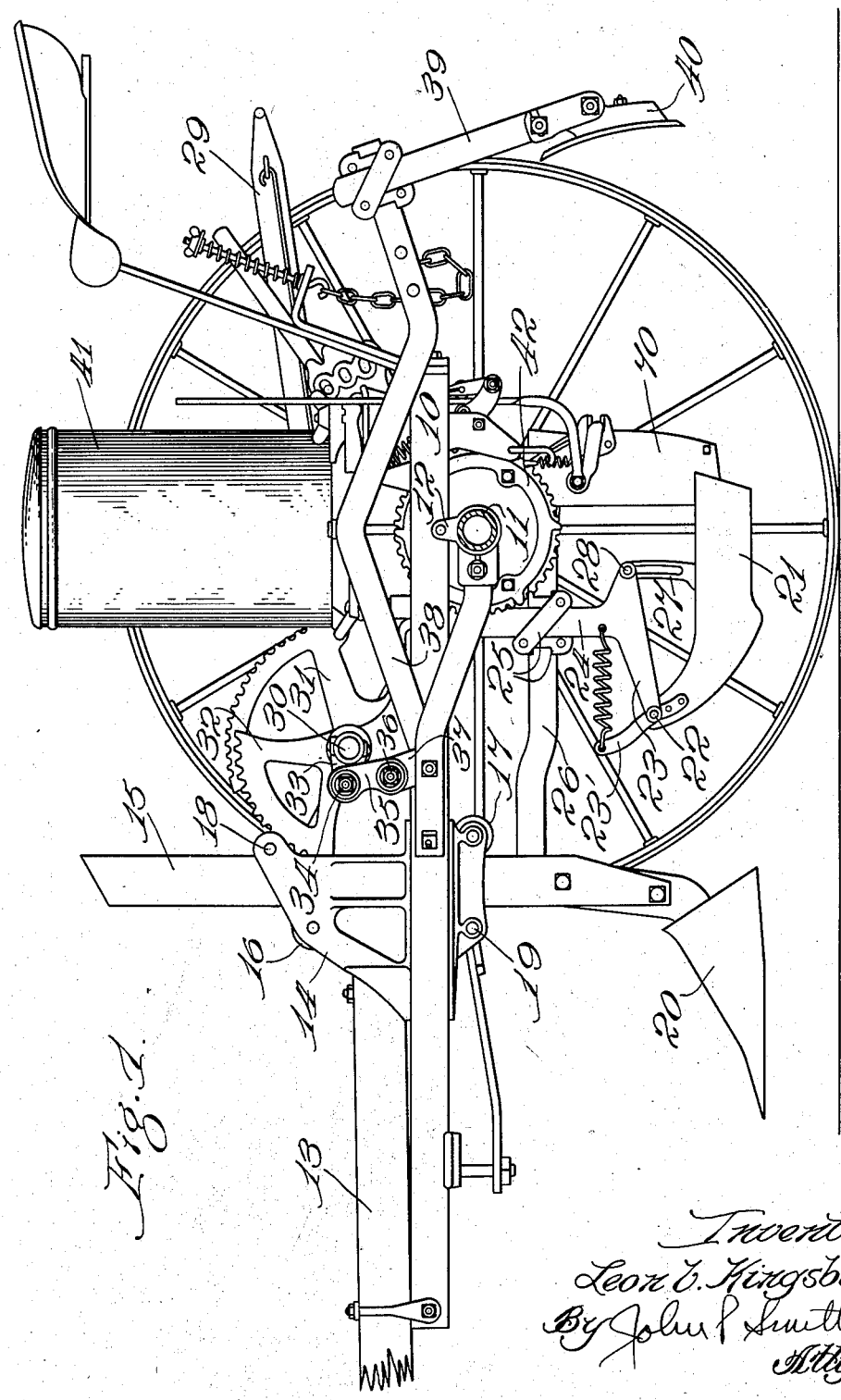

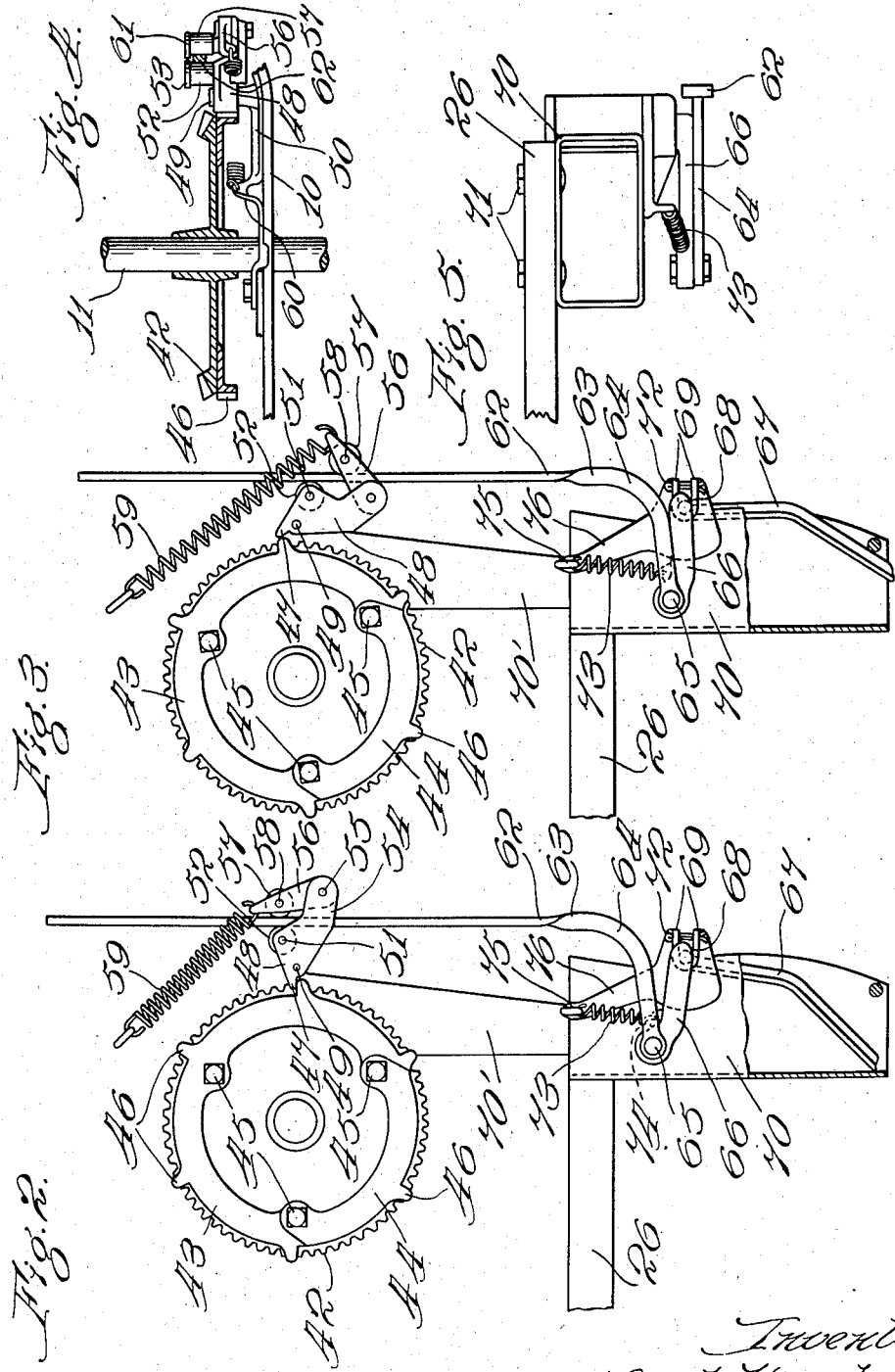

Patented Jan. 8, 1935

1,986,975

UNITED STATES PATENT OFFICE 1,986,975

HILL DROP PLANTER

Leon V. Kingsbury, South Bend, Ind., assignor to Oliver Farm Equipment Company, a corporation of Delaware Application August 13, 1932, Serial No. 628,673

9 Claims. (Cl. 111—34)

The present invention is directed generally to planters but more particularly to the type of planters known as hill drop planters, in which the valve mechanism may be operatively controlled regardless of the relative position of the valve with respect to the axle of the planter.

One of the objects of the present invention is to provide a novel and improved planting mechanism in which the seed can and operating mechanism therefor is mounted rigidly to the frame of the planter and the provision of a freely adjustable connection which permits the control of the valve regardless of the relative position the furrow opener and valve assume with respect to the axle of the planter.

A further object of the invention is to provide a novel and improved valve controlling mechanism for planter by means of which varying depth planting may be accomplished and the effective operation of the valve, as well as accurate operation thereof, may be secured regardless of the relative position of the planter furrow opener with respect to the axle of the planter.

These and other objects are accomplished by providing a construction and arrangement of the various parts in the manner hereinafter described and particularly pointed out in the appended claims.

Referring to the drawings, Fig. 1 is a fragmentary side elevational view partly in cross section of the conventional form of hill drop planter showing my improvements embodied therein.

Fig. 2 is an enlarged fragmentary side elevational view of the valve mechanism and its operating parts showing the same in a lowered or planting position with the valve closed.

Fig. 3 is a similar view showing the mechanism tripped and the valve open.

Fig. 4 is an enlarged top plan view partly in cross section of part of the operating valve mechanism shown in Figs. 2 and 3, and Fig. 5 is a top plan view of the valve and boot.

In illustrating one form of my invention I have shown the same in connection with a conventional form of planter which comprises a main frame generally indicated by the reference character 10 which is supported on an axle 11 through the medium of bearing brackets 12. Connected to the forward end of the main frame 10 is the usual pole or tongue 13. Secured adjacent the rear end of the tongue 13 and between the frame members 10 is a casting 14 which is adapted to vertically and reciprocally receive a vertical standard or beam 15. The beam 15 is adapted to ride over a forward roller 16 journalled in the upper portion of the bracket 14, and a lower roller 17 journalled in the lower end and rear portion of the bracket 14. The roller 16 engages the forward surface of the beam 15 and the beam is prevented from displacement between these rollers by a transverse pin 18 secured to the bracket 14 adjacent the upper end thereof, and a transverse pin 19 secured to the lower portion of the bracket 14 on the lower forward side of the beam 15. Secured to the lower end of the beam 15 is the usual furrow opener 20 which precedes in longitudinal alignment a planting shoe 21, which in turn has its forward end pivoted, as shown at 22, to the forward end or arm 23 of a substantially inverted T shaped member or standard 24. The member 24 is clamped between clamping members 25 to a horizontally extending bar 26 which has its forward end secured to the vertical beam or standard 15, in any well known manner. The clamping member 25 permits the vertical adjustment of the member 24 so that the planting shoe 21 may be vertically adjusted with respect to the furrow opener 20. An intermediate portion of planter shoe 21 is connected by slotted arcuate link 27 to a transverse pin 28 on the rear end of the member 24. Secured to the forward end of the shoe 21 and projecting upwardly therefrom is an arm 23' which has its upper end connected by means of an extension spring 24' to the member 24 for floatingly connecting the shoe to the member 24. The furrow opener 20 as well as the planting shoe 21 is manually and vertically adjusted by means of a hand operating lever 29 which has its lower end secured to a shaft 30 journalled in a sector bracket 31, which in turn, is secured to the main frame of the planter. The lever 29 is provided with the usual detent mechanism which operatively engages the teeth of the sector 31 for locking the lever in various positions of adjustment. Secured to the shaft 30 is a toothed sector 32 which is adapted to mesh with a vertical rack (not shown), formed in or attached to the rear of the beam 15 for effecting a vertical adjustment of the same. Also secured to the shaft 30 is a crank arm 33 which has its outer free end pivotally connected, as shown at 34, to a link 35, which in turn, is pivotally connected, as shown at 36, to a bracket 37 secured to the rearwardly extending beam 38. The rearward end of the beam 38 is provided with a downwardly extending member 39 which in turn, has secured to its lower end, a covering shoe 40. Mounted on suitable brackets secured to the frame of the planter is the usual seed can 41 which is provided with the conventional form of seed feeding mechanism. This feeding mechanism may be of any convenient or conventional form, but which, suffice to say, is driven by a gear 42 secured to the main axle 11.

The essential feature of the present invention consists of a novel connection for controlling the valve mechanism of the planter which effectively and efficiently operates the valve regardless of the relative position of the planter shoe and furrow opener, as well as the valve, with respect to the axle of the planter. This novel mechanism includes two arcuate plates 43 and 44 which, when secured in position by means of bolts 45 to the gear 42, form substantially a complete circle. Formed on the periphery of these arcuate members 44 and projecting radially therefrom are equally spaced apart trip lugs 46 which are adapted to engage and trip the inwardly projecting end 47 of a lever 48. The lever 48 is pivoted, as shown at 49, to a stud carried by a bracket 50, which in turn, is secured to the frame member 10 of the planter. Journalled on the lever 48, on a pin 51, adjacent the pivot 49, is a roller 52 which has its outer edge provided with a peripheral bead, as shown at 53. Pivotally secured to a rearwardly extending arm 54 of the lever 48, as shown at 55, is an upwardly projecting link 56. Journalled adjacent the upper end of and in horizontal alignment with the roller 52, is a second co-acting roller 57 which is journalled on a pin 58 secured to the link 56. The upper or free end of the link 56 is connected by means of an extension spring 59 to an ear 60 formed on the bracket 50. The roller 57 is similarly provided with a peripheral bead 61 which prevents the displacement of the operative connection connecting the trip with the valve which is of a construction hereinafter described.

Reciprocably mounted between the rollers 52 and 57 is an operative connection, generally indicated by the reference character 62, which is made from a bar of steel of rectangular cross section. This connection or bar 62 is adapted to move vertically upwardly or downwardly between the rollers 52 and 57 when the rollers are in horizontal alignment for adjusting the furrow opener 20, the planting shoe 21 and the valve generally with respect to the axle of the planter. The lower end of the bar 62 is twisted, as shown at 63, and has its lower end curved forwardly as shown at 64. The lower forward end is pivotally connected, as shown at 65, to the crank arm 66 of the valve 67. The valve 67 is pivoted or journalled, as shown at 68, between the bifurcated portion 69 of the seed boot 70. The seed boot 70 is secured to one side of the horizontal member 26 by means of bolts 71, and is adapted to be adjusted vertically together with the furrow opener and shoe 21. Extending from the seed feeding mechanism and extending into the boot 70 for conveying the seed to the valve is a seed tube 70'. The axis or pivotal portion of the valve 67 is retained within the bifurcated portion 69 by a cotter key 72. The valve 67 is normally actuated to its closed position or the position shown in Fig. 2 by an extension spring 73 which has its lower end thereof connected, as shown at 74, to an ear formed on the crank 66, and its upper end thereof connected, as shown at 75, to a bracket 76, which in turn, is secured to the boot 70.

The operation of my improved planting mechanism is as follows:—

Let us assume that all the parts of the planter are in the position shown in Fig. 1 of the drawings and that the operator is desirous of lowering the furrow opener, the seed shoe together with the boot to its operative position, in which case the lever 29 is raised upwardly and forwardly thereby depressing the toothed sector 32 which in turn engages the rack on the vertical beam 15 and lowers the furrow opener 20 into engagement with the ground. Simultaneously with this movement the bar 26 is lowered and carries with it the seed shoe 21 as well as the seed boot 70. During this lowering operation the trip lever 48 assumes the position, shown in Fig. 2, in which the rollers 52 and 57 are in horizontal alignment and permits the connection or connecting bar 62 to move unobstructedly between these rollers in its downward course, without affecting any of the operative parts of the planting mechanism. When the seed from the seed can 41 is fed by the seed feeding mechanism of the conventional construction by reason of being driven by the driving gear 42 into the seed tube 70' it will be deposited on the top of the lower end of the valve 67 in the manner well understood in the art. As the gear 42 is revolved in its normal operation to a position in which one of the radially projecting lugs 46 engages the forwardly projecting portion 47 of the trip lever 48, the lever will be actuated from the position shown in Fig. 2 to the position shown in Fig. 3, in which case the frictional resistance offered by the extension spring 59 impinges the bar 62 between the rollers 52 and 57 and actuates the lever 48 downwardly about its pivot 49 and depresses the rod 62 downwardly against the action of the spring 73 to open the valve and drop the seed at a point at the rear end of the seed shoe 21. As the lug 46 passes the pointed end 47 of the lever 48 the trip mechanism will then be returned to its normal position or the position shown in Fig. 2, preparatory to again tripping the lever and opening the valve. It will be noted that by this roller trip construction, any variation depth planting may be secured by the adjustment of the lever 29 without affecting the operative relation of the relatively stationary trip mechanism and the valve mechanism carried by the boot.

It will be noted from the above specification that I have provided a simple, efficient and effective operating connection for controlling a floating valve with a relatively stationary seed feeding mechanism in which the seed can and its operating parts are mounted fixedly or relatively so on the frame of the planter.

While in the above specification I have described one embodiment which my invention may assume in practice, it will of course be understood, that the same is capable of modification and that modification may be made without departing from the spirit and scope of the present invention as expressed in the following claims.

What I claim as my invention and desire to secure by Letters Patent is:

1. A planter comprising a frame, a seed feeding mechanism mounted on said frame, a planting shoe adjustably mounted on said frame, a seed boot associated with said shoe and adjustable therewith, a valve mounted in said boot, and vertically actuated means including a vertically extending bar associated with said seed feeding mechanism and operatively connected directly with said valve for controlling the operation of said valve regardless of the relative position of said boot with respect to said seed feeding mechanism.

2. A planter comprising a main frame, a relatively stationary seed can mounted on said main frame, seed feeding mechanism associated with said seed can, driving means for driving said seeding mechanism, relatively adjustable furrow opening means supported by said main frame, a seed valve adjustable with said furrow opening means, and a vertically actuated connection extending directly between said valve and said driving means for controlling the operation of said valve regardless of the relative position of said valve with respect to said driving means.

3. A planter comprising a frame, a relatively stationary seed feeding mechanism mounted on said frame, driving means for driving said seed feeding mechanism, vertically adjustable furrow opening means carried by said main frame, a tripping mechanism carried by said main frame and operatively connected with said driving means, a seed valve carried by said furrow opening means, and vertically actuated means for controlling said valve by said tripping mechanism regardless of the relative position of said valve with respect to said tripping mechanism.

4. A planter comprising a frame, a seed can mounted on said frame, seed feeding mechanism mounted on said frame for feeding seed from said can, driving means mounted on said frame for driving said seed feeding mechanism, vertically adjustable furrow opening means mounted on said frame, a seed valve carried by said furrow opening means, and a freely vertically actuated and adjustable connection between said driving means and said valve for controlling the actuation of said valve regardless of its relative position with respect to said driving means.

5. A planter comprising a frame, seed feeding mechanism mounted on said frame, driving means for driving said seed feeding mechanism mounted on said frame, adjustable furrow opening means carried by said frame, a valve carried by said furrow opening means, a trip mounted on said frame and operatively driven by said driving means, two spaced apart rollers carried by said trip, and a connecting member extending between said rollers and connected to said valve for actuating said valve regardless of the relative position of said valve with respect to said trip.

6. A planter comprising a frame, seed feeding mechanism mounted on said frame, driving means for driving said seed feeding mechanism, a vertically adjustable furrow opening means carried by said frame, a tripping mechanism mounted on said frame and operatively related to said driving means, a seed valve carried by said furrow opener, and a vertically actuated bar for connecting said trip with said valve whereby said valve may be adjusted with respect to said trip without affecting the operative relationship between said valve and said trip.

7. A planter comprising a main frame, a main drive shaft mounted on said frame, wheel support for said shaft, seed feeding mechanism secured to said main frame and operatively driven by said shaft, a trip pivoted to said main frame and operatively related to said shaft, a furrow opener vertically adjustable with respect to said main frame, a seed boot carried by said furrow opener, a valve carried by said boot, and a vertically actuated connection connecting said valve with said trip whereby the operative relationship between the valve and said trip may be maintained regardless of the relative position of said valve with respect to said trip.

8. A planter comprising a main frame, a seed can and seed feeding mechanism mounted on said main frame, driving means mounted on said main frame for driving said seed feeding mechanism, a trip pivoted to said main frame and adapted to be actuated by said driving means, a roller journalled on said trip, a link pivoted to said trip having a roller journalled thereon adapted to co-act with said first named roller, vertically adjustable furrow opener carried by said frame, a seed boot carried by said furrow opener, a seed valve carried by said boot, and a trip member pivotally connected to said valve and extending between said rollers for actuating said valve thereby and permitting vertical adjustment of said valve with respect to said trip without affecting the operative relationship between said valve and said trip.

9. A planter comprising a main frame, a seed can and seed feeding mechanism mounted on said main frame, driving means for driving said seed feeding mechanism, a trip pivoted to said frame and adapted to be actuated by said driving means, a roller journalled on said trip, a link pivoted to said trip, a roller journalled on said link and adapted to co-act with said first named roller, a spring connected with said link for normally forcing said rollers together and actuating said trip into the path of movement of said driving means, a vertically adjustable furrow opening means carried by said main frame, a seed boot carried by said furrow opener, and a vertically movable bar connected to said valve and extending between said rollers for controlling the actuation of said valve by said trip and permitting vertical adjustment of said valve with respect to said trip without affecting the operative relationship between said trip and said valve.

LEON V. KINGSBURY.